US012604794B2

(12) United States Patent
Jagow et al.

(10) Patent No.: US 12,604,794 B2
(45) Date of Patent: Apr. 21, 2026

(54) SINGULATING ARRANGEMENT AND EXTRACTION FROM SINGULATING METER

(71) Applicant: Bourgault Industries Ltd., St. Brieux (CA)

(72) Inventors: Scot Jagow, St. Brieux (CA); Aden Arguin, St. Brieux (CA); Brennan Crooymans, St. Brieux (CA); Ryan Cowan, St. Brieux (CA); Jami Rieder, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 976 days.

(21) Appl. No.: 17/748,138

(22) Filed: May 19, 2022

(65) Prior Publication Data

US 2022/0369541 A1    Nov. 24, 2022

(30) Foreign Application Priority Data

May 21, 2021    (CA) ................................. CA 3119317

(51) Int. Cl.
    *A01C 7/12*        (2006.01)
    *A01C 7/10*        (2006.01)
(52) U.S. Cl.
    CPC .............. *A01C 7/128* (2013.01); *A01C 7/105* (2013.01)
(58) Field of Classification Search
    CPC ........... A01C 7/12; A01C 7/102; A01C 7/105; A01C 7/127; A01C 7/128
    See application file for complete search history.

(56) References Cited

U.S. PATENT DOCUMENTS

| | | | |
|---|---|---|---|
| 4,399,757 A | 8/1983 | Maury | |
| 4,793,511 A | * 12/1988 | Ankum et al. ....... | A01C 7/0445 |
| | | | 221/254 |
| 9,010,258 B1 | 4/2015 | Richard et al. | |
| 9,578,798 B2 | 2/2017 | Scheideler | |
| 9,713,298 B2 | 7/2017 | Garner | |

(Continued)

FOREIGN PATENT DOCUMENTS

| | | | | |
|---|---|---|---|---|
| CN | 110082143 A | * 8/2019 | .............. | G01D 5/32 |
| WO | WO-2021073879 A1 | * 4/2021 | .............. | A01C 7/18 |

OTHER PUBLICATIONS

Wang et al., Chinese Patent No. 110082413 A (machine translation), Aug. 2, 2019. (Year: 2019).*

Primary Examiner — Tara Mayo
(74) Attorney, Agent, or Firm — FBT Gibbons LLP; Nicole M. Tepe

(57)        ABSTRACT

A singulating meter apparatus comprising a seed disc operative to be rotated in a housing about a disc rotational axis with inner and outer rows of seed apertures defined by the seed disc. A singulator is arranged to protrude from an outer and inner side of both paths. A seed output port is operative to receive seeds from the seed apertures in the inner and outer aperture rows. In a single mode both rows are dispensed into a single seed conduit, and in a dual mode the seeds from each row are dispensed into individual conduits. A seed counting sensor is mounted on the seed output port counts the seeds passing through the seed output port in both the inner and outer seed conduits. A four row disc is also provided that as well has dual and single options.

16 Claims, 8 Drawing Sheets

(56)　　　　　References Cited

U.S. PATENT DOCUMENTS 11,730,079 B2 *　8/2023　Wilhelmi et al. ........ A01C 7/20
　　　　　　　　　　　　　　　　　111/171
2002/0170476 A1 *　11/2002　Bogner et al. ....... A01C 21/005
　　　　　　　　　　　　　　　　　111/900
2015/0351314 A1 *　12/2015　Sauder et al. .......... A01C 7/10
　　　　　　　　　　　　　　　　　700/275
2017/0086351 A1 *　3/2017　Garner et al. ......... A01C 7/105
2017/0086358 A1 *　3/2017　Garner .................. A01C 7/102

* cited by examiner

SINGULATING ARRANGEMENT AND EXTRACTION FROM SINGULATING METER

CROSS REFERENCE TO RELATED APPLICATION

This application claims priority to and benefit of CA Application No. 3,119,317, filed May 21, 2021, the contents of which are incorporated by reference in its entirety for all purposes.

FIELD OF THE INVENTION

This disclosure relates to the field of agricultural seeding implements and in particular a singulating meter for both large and small seeds.

BACKGROUND

Singulating meters have typically been used to seed crops such as corn where it is desired to space corn seeds in a furrow at a uniform spaced distance from each other. The required spacing for corn seeds is relatively large, and so the perforated seed disc of the singulating meter with a single row of seed apertures can be rotated at a suitable speed. Other crops, such as soybeans, require a smaller distance between the seeds and to achieve this spacing, a seed disc with a single row of seed apertures must turn much faster. To avoid excessive speeds, singulating meter discs with two concentric sets of seed apertures have been developed.

U.S. Pat. No. 9,578,798 to Scheideler discloses such a singulating meter discs with two concentric sets of seed apertures. Such seed discs are susceptible to drawing two seeds into some of the seed apertures instead of a single seed and so typically include singulators operative to dislodge one of the seeds. Scheideler discloses a corresponding singulator for each row of seed apertures.

U.S. Pat. No. 9,713,298 to Garner discloses the holes on the inner row of holes radially spaced between the holes on the outer row of holes such that seeds are dispensed alternately into the furrow opener and the spacing is consistent.

U.S. Pat. No. 9,010,258 to Richard et al. discloses a singulating meter comprising a drum with two sets of side by side seed apertures, again offset such that the seeds are dispensed alternately from each side and the spacing is again consistent. The Richard disclosure also includes a separate seed outlet for the seed apertures on each side.

U.S. Pat. No. 4,399,757 to Maury discloses a singulating meter inner and outer rows of seed apertures, where the seeds in each row are dispensed into separate seed conduits.

SUMMARY

The present disclosure provides a singulating meter apparatus that overcomes problems in the prior art.

In a first embodiment the present disclosure provides a singulating meter apparatus comprising a seed disc operative to be rotated in a housing about a disc rotational axis with concentric first and second aperture rows of seed apertures defined by a seed side of the seed disc. The first aperture row is spaced along an outer first circular path with a first radius, the second aperture row is spaced along a second circular path with a second radius that is less than the first radius. A first singulator is arranged to protrude from an outer side of the first circular path partially into the seed apertures on the first aperture row as the seed disc rotates and a second singulator arranged to protrude from an inner side of the second circular path partially into the seed apertures on the second aperture row as the seed disc rotates. A third singulator is arranged to protrude from an inner side of the first circular path partially into the seed apertures on the first aperture row as the seed disc rotates and further arranged to protrude from an outer side of the second circular path partially into the seed apertures on the second aperture row as the seed disc rotates.

In a second embodiment the present disclosure provides a singulating meter apparatus comprising a housing and a two-row seed disc operative to be rotated inside the housing about a disc rotational axis. Concentric inner and outer aperture rows of seed apertures are defined by a seed side of the two-row seed disc wherein the outer aperture row is spaced along an outer circular path with an outer radius, and the inner aperture row is spaced along an inner circular path with an inner radius that is less than the outer radius. A seed output port operative to receive seeds from the seed apertures in the inner and outer aperture rows. The seed output port is operative, when in a single mode, to dispense the seeds received from the inner and outer aperture rows into a single seed conduit, and wherein the seed output port is operative, when in a dual mode, to dispense the seeds received from the seed apertures in the outer aperture row into an outer seed conduit, and is further operative when in the dual mode to dispense the seeds received from the seed apertures in the inner aperture row into an inner seed conduit.

In a third embodiment the present disclosure provides a singulating meter apparatus comprising a housing and a four-row seed disc operative to be rotated inside the housing about a disc rotational axis. The four-row seed disc comprises concentric first, second, third, and fourth aperture rows of seed apertures defined by a seed side of the four-row seed disc wherein the first aperture row is spaced along a first circular path with a first radius, the second aperture row is spaced along a second circular path with a second radius that is less than the first radius, the third aperture row is spaced along a third circular path with a third radius that is less than the second radius, and the fourth aperture row is spaced along an fourth circular path with a fourth radius that is less than the third radius. An upper seed output port is operative to receive seeds from the seed apertures in the first and second aperture rows, and a lower seed output port is operative to receive seeds from the seed apertures in the third and fourth aperture rows.

In a fourth embodiment the present disclosure provides a singulating meter apparatus comprising a two-row seed disc operative to be rotated about a disc rotational axis, with concentric inner and outer aperture rows of seed apertures defined by a seed side of the two-row seed disc wherein the outer aperture row is spaced along an outer circular path with an outer radius, the inner row aperture is spaced along an inner circular path with an inner radius that is less than the outer radius. A seed output port is operative to dispense the seeds received from the seed apertures in the outer aperture row into an outer seed conduit, and to dispense the seeds received from the seed apertures in the inner aperture row into an inner seed conduit, and a seed counting sensor is mounted on the seed output and operative to count the seeds passing through the seed output port in the inner and outer seed conduits.

In a fifth embodiment the present disclosure provides a singulating meter apparatus comprising a four-row seed disc operative to be rotated inside the housing about the disc rotational axis, the four-row seed disc comprising concentric first, second, third, and fourth aperture rows of seed apertures defined by a seed side of the four-row seed disc wherein the first aperture row is spaced along a first circular path with a first radius, the second aperture row is spaced along a second circular path with a second radius that is less than the first radius; the third aperture row is spaced along a third circular path with a third radius that is less than the second radius; and the fourth aperture row is spaced along an fourth circular path with a fourth radius that is less than the third radius. The seed apertures on the first aperture row are on a plurality of equally spaced first radial lines, the seed apertures on the second aperture row are on a plurality of equally spaced second radial lines, the seed apertures on the third aperture row are on a plurality of equally spaced third radial lines, and the seed apertures on the fourth aperture row are on a plurality of equally spaced fourth radial lines. The seed apertures on the each aperture row are positioned relative to the seed apertures on the other aperture rows such that seeds in the first, second, third, and fourth aperture rows alternate as the seeds pass through an output port, and a seed counting sensor is operative to count the seeds passing through the seed output port.

The present disclosure thus improves singulation spacing by reducing the number of apertures that contain two seeds. Also disclosed is an apparatus that allows a two-row seed disc to deposit larger seeds, such as soybeans, in single seed conduit for delivery to a single furrow opener, and smaller seeds such as canola, into two separate seed conduits for delivery to two separate furrow openers. The apparatus discloses a four-row disc where, similarly, the seeds from the outer two rows can be deposited into a single conduit or into individual conduits, and the seeds from the inner two rows can also be deposited into a single conduit or into individual conduits. A seed counting sensor is provided that, using a single sensor, counts all the seeds dispensed by the singulating meter apparatus.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE
ILLUSTRATED EMBODIMENTS

Figure 1:
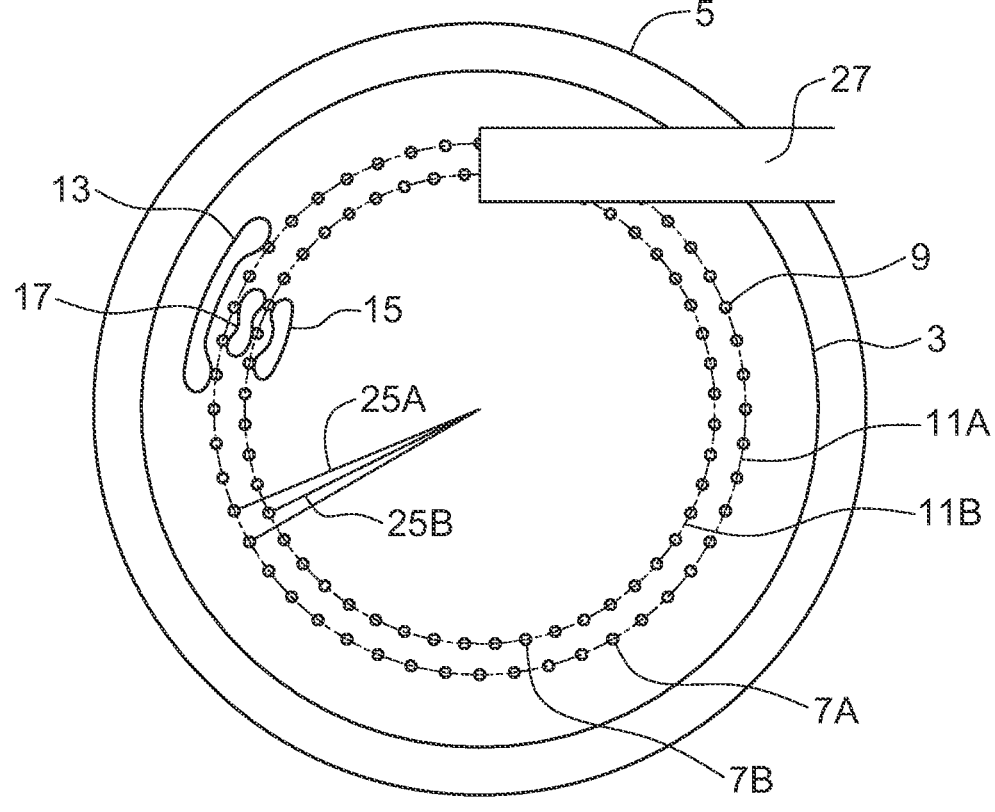
FIG. 1 is a schematic side view of an embodiment of the singulating meter apparatus of the present disclosure with a two-row seed disc.
Figure 2:
FIG. 2 is a schematic sectional end view of the embodiment of 1 showing the singulator assembly and the opposite side of the housing.

FIGS. 1 and 2 schematically illustrate an embodiment of a singulating meter apparatus 1 of the present disclosure comprising a seed disc 3 operative to be rotated in a housing 5 about a disc rotational axis DRA. To reduce the occurrence of two seeds being held in one the seed apertures 9 singulators protrude partially into the path of the seed apertures to dislodge the second seed. The present disclosure provides such a singulator assembly that dislodges seeds from both sides of the path in a seed disc 3 that has more than one row of seed apertures.

Concentric first and second aperture rows 7A, 7B of seed apertures 9 are defined by a seed side of the seed disc 3. The first aperture row 7A is spaced along an outer first circular path 11A with a first radius AR, the second aperture row 7B is spaced along a second circular path 11B with a second radius BR that is less than the first radius AR.

A first singulator 13 is arranged to protrude from an outer side of the first circular path 11A partially into the seed apertures 9 on the first row 7A as the seed disc 3 rotates. A second singulator 15 is arranged to protrude from an inner side of the second circular path 11B partially into the seed apertures 9 on the second aperture row 7B as the seed disc rotates. A third singulator 17 is arranged to protrude from an inner side of the first circular path 11A partially into the seed apertures 9 on the first aperture row 7A as the seed disc rotates and further arranged to protrude from an outer side of the second circular path 11B partially into the seed apertures 9 on the second aperture row 7B as the seed disc rotates.

In the illustrated embodiment the seed apertures 9 on the first aperture row 7A are on a plurality of equally spaced first radial lines 25A and the seed apertures on the second aperture row 7B are on a plurality of equally spaced second radial lines 25B and the second radial lines 25B are substantially midway between the first radial lines 25A. In such an arrangement the seeds carried in the seed aperture 9 alternate evenly as they are dispensed from the seed output port 27.

Figure 1A:
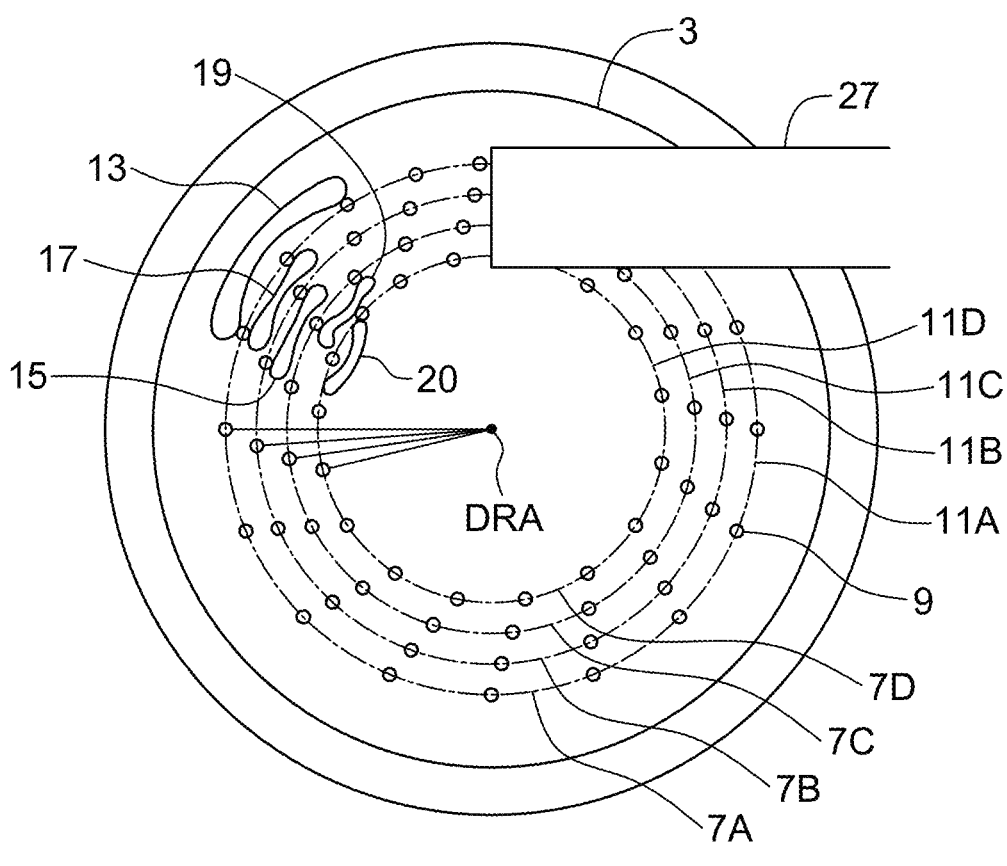
FIG. 1A is a schematic side view of an embodiment of the singulating meter apparatus of the present disclosure with a four-row seed disc.

As seen in FIG. 1A, the apparatus 1 can further comprise a concentric third and fourth aperture rows 7C 7D of seed apertures 9 defined by the seed disc 3 and spaced along a third circular path 11C with a third radius CR that is less than the second radius BR, and along a fourth circular path 11D with a fourth radius DR that is less than the third radius CR.

A fourth singulator 19 is arranged to protrude from an inner side of the third circular path 11C partially into the seed apertures 9 on the third aperture row 7C as the seed disc rotates. The second singulator 15 is further arranged to protrude from an outer side of the third circular path 11C partially into the seed apertures 9 on the third aperture row 7C as the seed disc rotates. Similarly a fifth singulator 20 is arranged to protrude from an inner side of the fourth circular path 11D partially into the seed apertures 9 on the fourth aperture row 7D as the seed disc rotates. The fourth singulator 19 is further arranged to protrude from an outer side of the fourth circular path 11D partially into the seed apertures 9 on the fourth aperture row 7D as the seed disc rotates.

Figure 3:
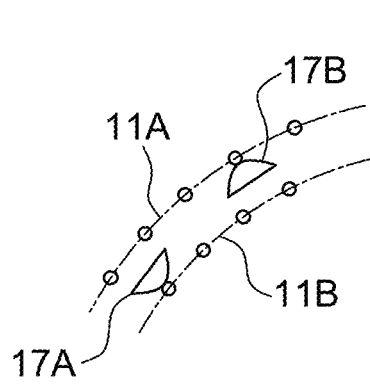
FIG. 3 is a schematic side view showing the third singulator in two separate portions.

The first, second, third, fourth, and fifth singulators 13, 15, 17, 19, and 20 are mounted on a singulating assembly 21 that is attached to the opposite side of the housing 5A as shown in FIG. 2, and springs 23 exert a bias force BF pushing the singulator assembly 21 against the face of the seed disc 3.

Where a third row 7C or fourth row 7D of seed apertures 9 is present, the seeds can be located on radial lines that are separated by substantially one third or one fourth of the spacing distance to achieve an even seed spacing.

Where more convenient, any of the singulators can be made up of two separate singulator portions, as shown for example by singulator 17A, 17B as shown in FIG. 3.

Figure 4:
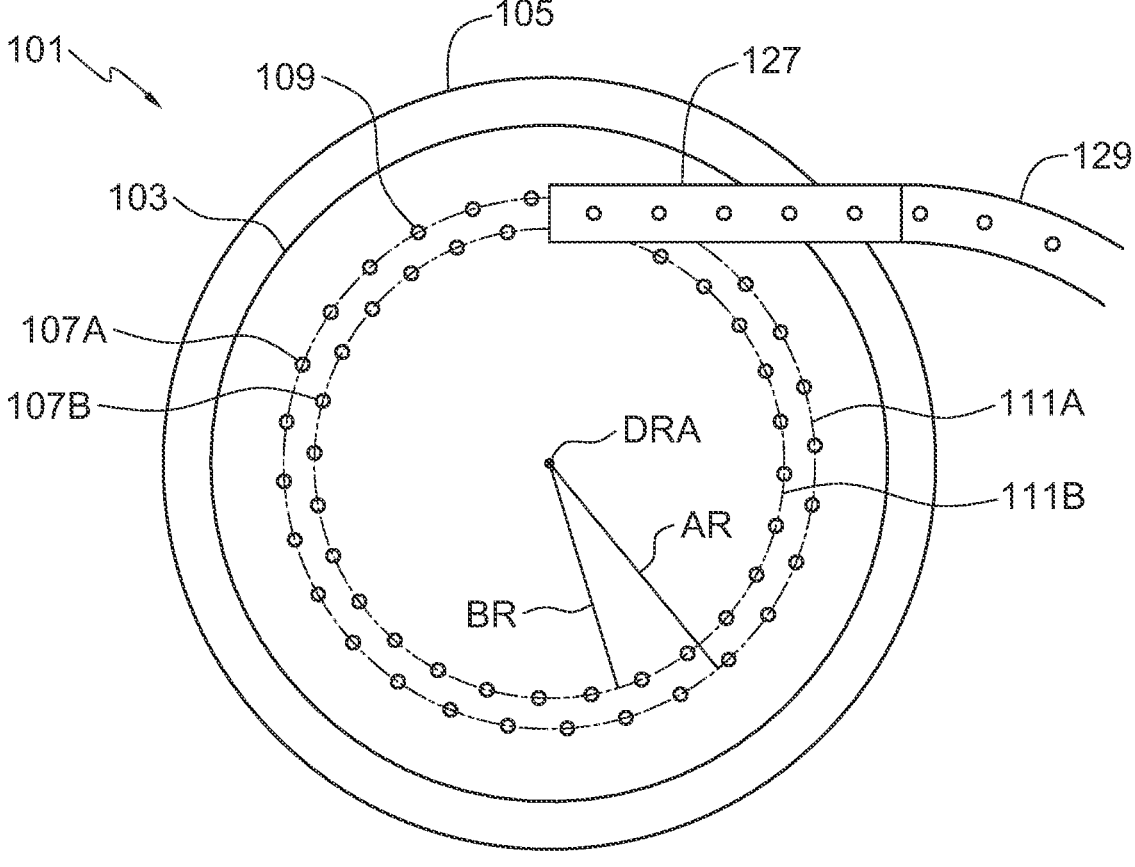
FIG. 4 is a schematic side view of an alternate embodiment of the singulating meter apparatus of the present disclosure showing the apparatus in the single mode.

FIG. 4 schematically illustrates a singulating meter apparatus 101 comprising a housing 105 and a tow-row seed disc 103 operative to be rotated inside the housing about a disc rotational axis DRA. Concentric outer and inner aperture rows 107A, 107B of seed apertures 109 are defined by a seed side of the two-row seed disc 103 wherein the outer aperture row 107A is spaced along an outer circular path 111A with an outer radius AR, and the inner aperture row 107B is spaced along an inner circular path 111B with an inner radius BR that is less than the outer radius AR.

A seed output port 127 is operative to receive seeds from the seed apertures 109 in the outer and inner aperture rows 107A, 107B. The seed output port 127 is operative, when in a single mode as shown in FIG. 4, to dispense the seeds received from the outer and inner aperture rows 107A, 107B into a single seed conduit 129, and the seed output port 127 is operative, when in a dual mode as shown in FIG. 5, to dispense the seeds received from the seed apertures in the outer aperture row 107A into an outer seed conduit 131A, and is further operative when in the dual mode to dispense the seeds received from the seed apertures in the inner aperture row 107B into an inner seed conduit 131B.

The seed output port 127 could be removed and replaced by a seed output port with two channels to connect to the outer and inner seed conduits 131A, 131B. The illustrated apparatus 101 however comprises a convertor 133 operative to be inserted into the seed output port 127. The convertor 133 defines outer and inner seed channels 135A, 135B. When the seed output port 127 is in the single mode of FIG. 4, the convertor 133 is removed and the single seed conduit 129 is connected to the seed output port 127, and when the seed output port is in the dual mode of FIG. 5 the convertor 133 is inserted into the seed output port 127 and the outer and inner seed conduits 131A, 131B are connected to the channels 135A, 135B defined by the convertor 133.

The convertor 133 can be inserted into the seed output port from outside the housing 5, or from inside the housing when disassembling the singulating meter apparatus 101 to change seed discs 103.

Figure 5:
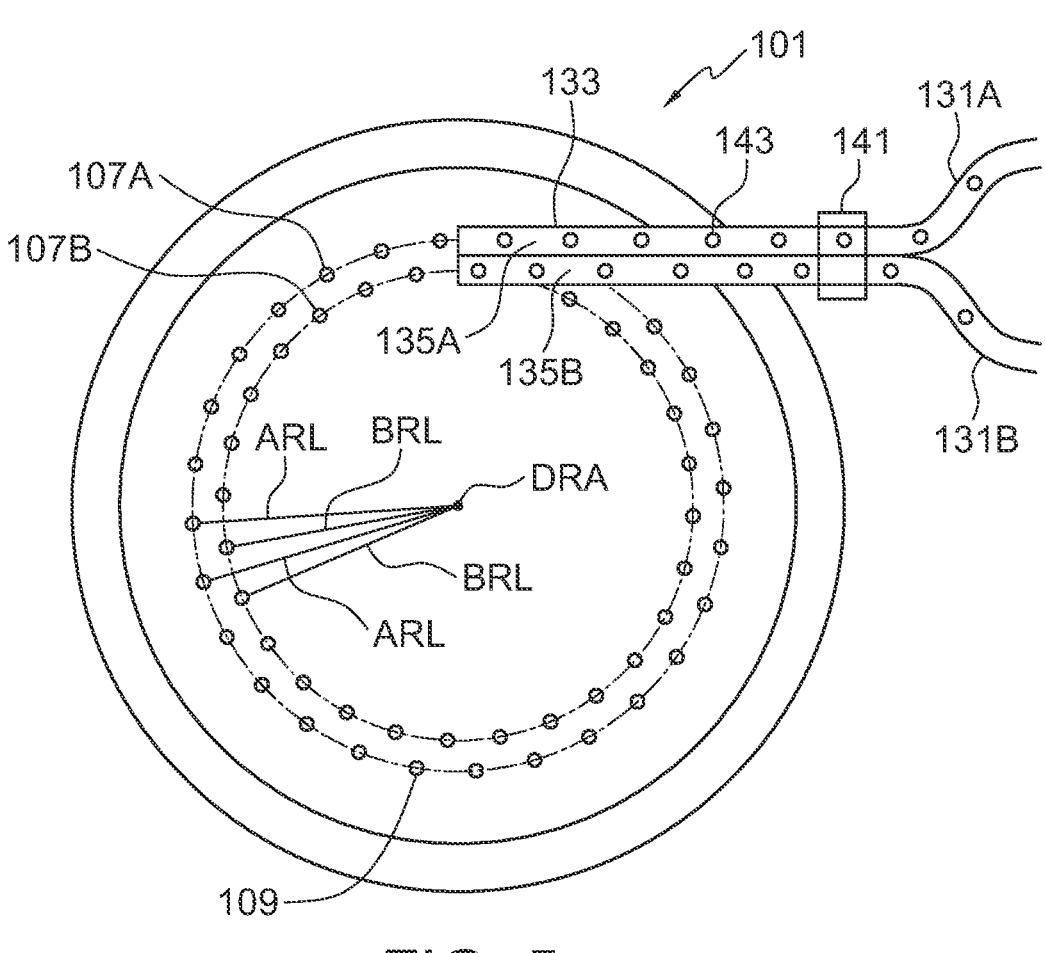
FIG. 5 is a schematic side view of the embodiment of FIG. 4 in the dual mode.
Figure 8:
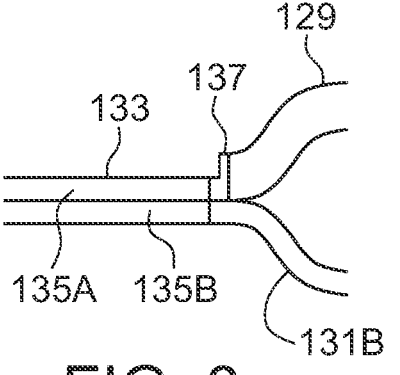
FIG. 8 is schematic side view of an adaptor for attaching the larger seed conduit to the converter.
Figure 9:
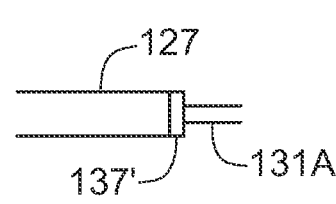
FIG. 9 is a schematic side view of an adaptor for attaching a smaller seed conduit to the seed output port.

The FIG. 5 shows two substantially equal sized seed conduits 131A, 131B which is preferred where singulation is important, however to simplify the arrangement of conduits, one of the inner and outer seed conduits 131A, 131B can be provided by the single seed conduit 129 connected to an adaptor 137 as seen in FIG. 8. Similarly, again where singulation is not so important, such as where collision with conduit walls affects seed spacing, the single seed conduit 129 can be provided by one of the inner and outer seed conduits 131A, 131B connected to an adaptor 137', as shown in FIG. 9.

Where a one-row seed disc defining a solitary row of seed apertures is installed in the singulating meter apparatus 101, the seed output port 127 is in the single mode.

The apparatus 101 can be used in the single mode to seed, for example, soybeans with the single seed conduit 129 dispensing seeds from both rows to achieve a desired seed rate to furrow openers spaced at a wide row spacing. The same apparatus 101, by changing the seed disc and adding the converter 133, can be used in the dual mode to seed canola in a narrow row spacing with seeds from each row 107A, 107B being directed to two different furrow openers.

Figure 10:
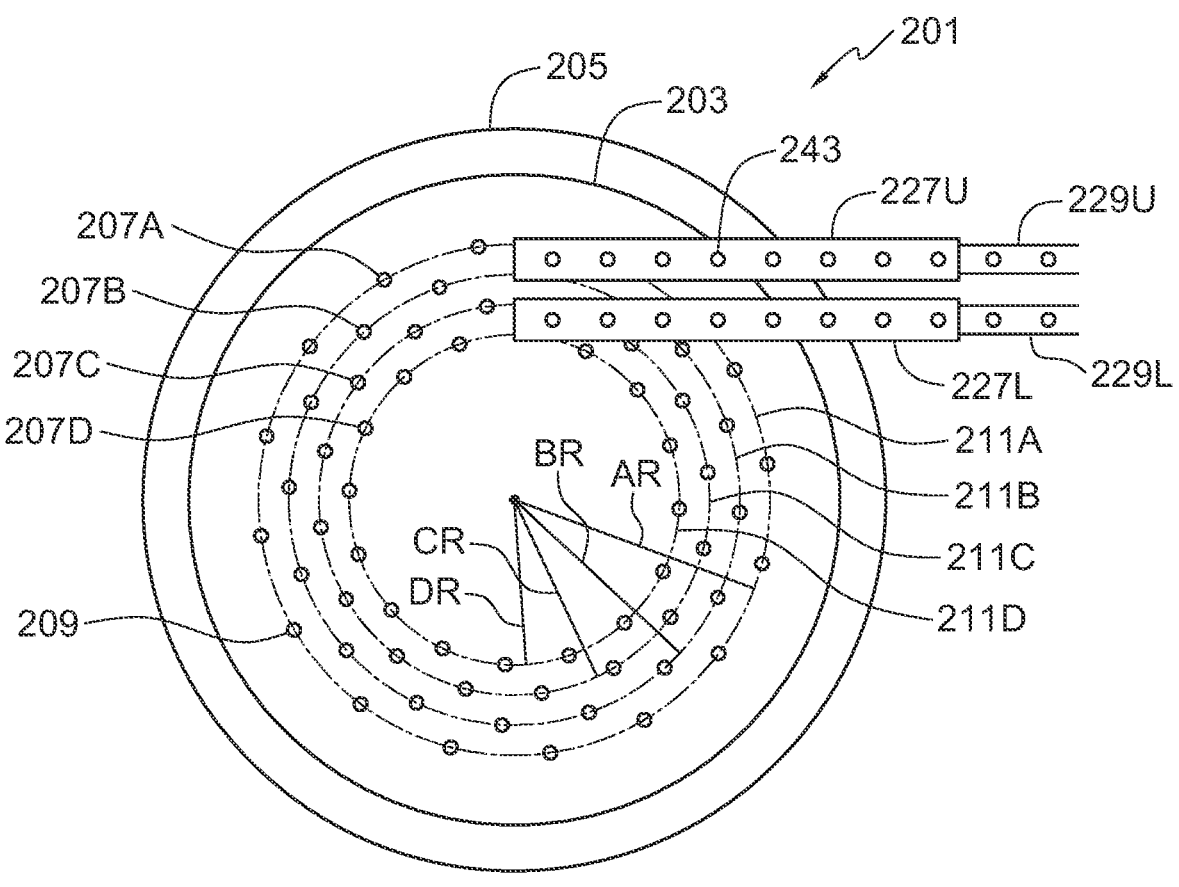
FIG. 10 is a schematic side view of an alternate embodiment of the present disclosure with four seed rows in the single mode.

FIG. 10 schematically illustrates a singulating meter apparatus 201 comprising a housing 205 and a four-row seed disc 203 operative to be rotated inside the housing about a disc rotational axis DRA. The four-row seed disc 203 comprises concentric first 207A, second 207B, third 207C, and fourth 207D aperture rows of seed apertures 209 defined by a seed side of the four-row seed disc 203.

The first aperture row 207A is spaced along a first circular path 211A with a first radius AR, the second aperture 207B row is spaced along a second circular path 211B with a second radius BR that is less than the first radius AR, the third aperture row 207C is spaced along a third circular path 211C with a third radius CR that is less than the second radius BR, and the fourth aperture row 207D is spaced along an fourth circular path 211D with a fourth radius DR that is less than the third radius CR.

An upper seed output port 227U is operative to receive seeds from the seed apertures in the first and second aperture rows 207A, 207B, and a lower seed output port 227L is operative to receive seeds from the seed apertures in the third and fourth aperture rows 207C, 207D.

Figure 11:
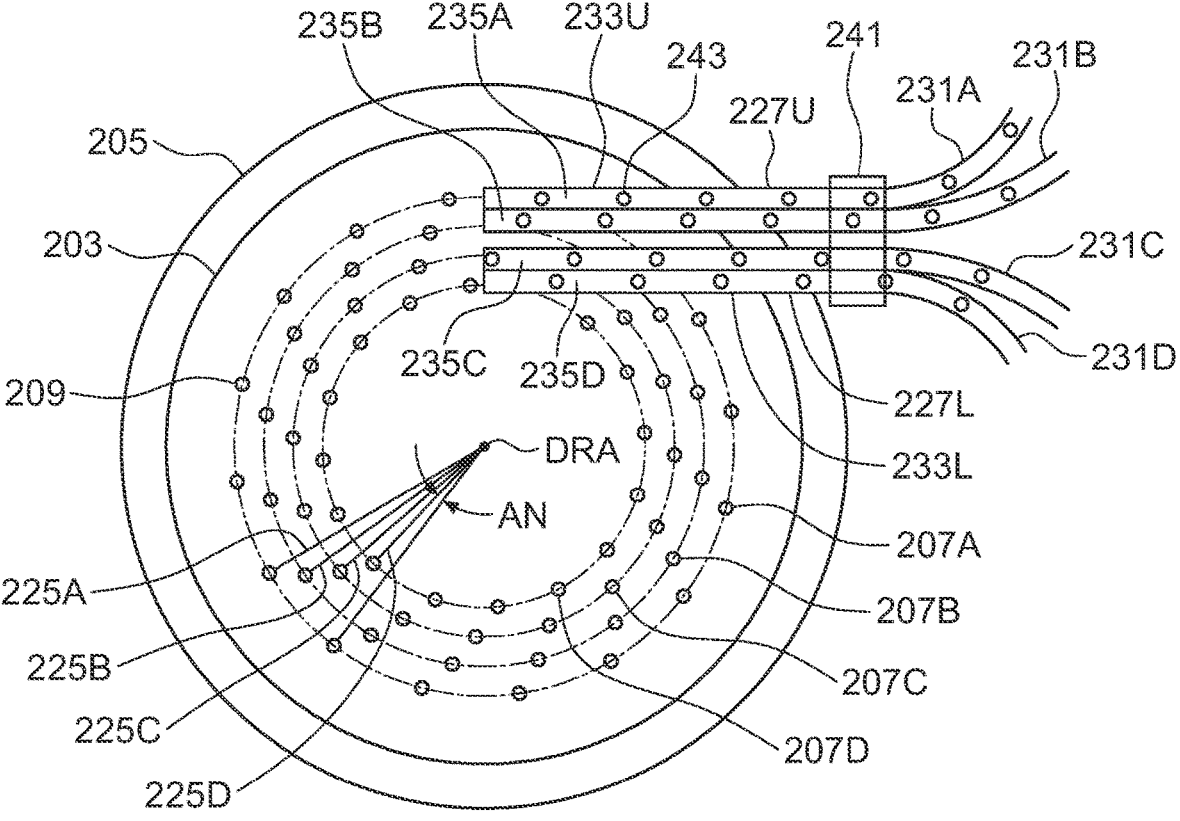
FIG. 11 is a schematic side view of the embodiment of FIG. 10 in the dual mode.

The apparatus 201 is operative in a single mode shown in FIG. 10 and in a dual mode shown in FIG. 11. In the single mode the upper seed output port 227U directs the seeds received from the seed apertures in the first and second aperture rows 207A, 207B into an upper seed conduit 229U, and the lower seed output port 227L directs the seeds received from the seed apertures in the third and fourth aperture rows 207C, 207D into a lower seed conduit 229L.

When the apparatus 201 is in the dual mode the upper seed port 227U is operative to direct the seeds received from the seed apertures in the first aperture row 207A into a first seed conduit 231A and to direct the seeds received from the seed apertures in the second aperture row 207B into a second seed conduit 231B, and the lower seed port 227L is operative to direct the seeds received from the seed apertures in the third aperture row 207C into a third seed conduit 231C and to direct the seeds received from the seed apertures in the fourth aperture row 207D into a fourth seed conduit 231D.

Figure 6:
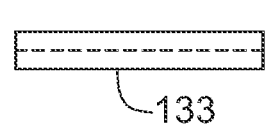
FIG. 6 is a schematic side view of the converter shown in FIG. 5.
Figure 7:
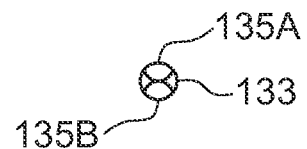
FIG. 7 is a schematic end view of the converter of FIG. 6.

To change from the single mode of FIG. 10 to the dual mode of FIG. 11 the upper and lower seed output ports 127U, 127L could be removed and replaced by seed output ports with two channels to connect to the conduits 231A-231D, or, as disclosed above, an upper converter 233U can be inserted into the upper seed output port 227U, the upper converter 233U defining first and second seed channels 235A, 235B connected to the corresponding first and second seed conduits 231A, 231B, and a lower converter 233L can be inserted into the lower seed output port 227L defining third and fourth seed channels 235C, 235D connected to the corresponding third and fourth seed conduits 231C, 231D. The converters 233U, 233L are substantially the same as the converters schematically shown above in FIGS. 5 and 6.

The singulating meter apparatus 201 can conveniently be converted from the single mode seeding soybeans, for example, into two separate furrows to the dual mode seeding canola, for example, into four separate furrows.

Figure 12:
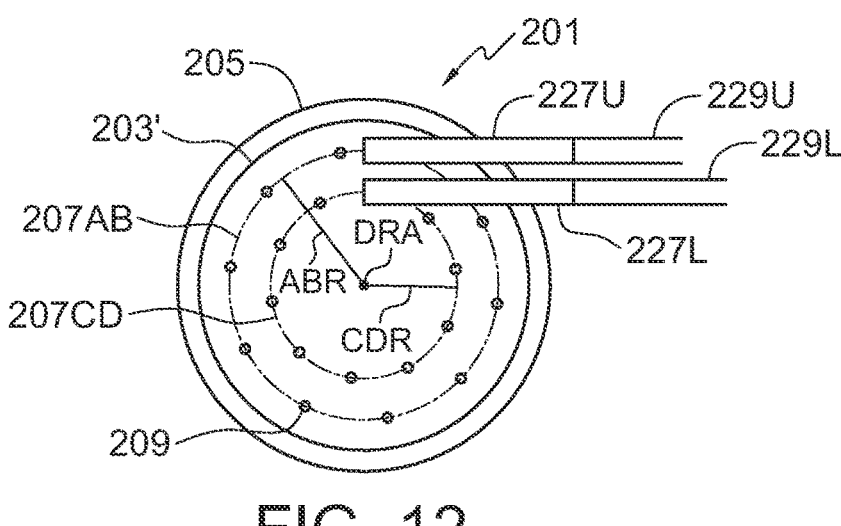
FIG. 12 is a schematic side view of a further alternate embodiment of the present disclosure.

FIG. 12 schematically illustrates the apparatus 201 further comprising a two-row seed disc 203' operative to be rotated inside the housing 205 about a disc rotational axis DRA. The two-row seed disc 203' comprises an outer row 207AB of seed apertures 209 with a radius ABR that is between the first and second radius AR, BR of FIG. 10, and an inner row 207CD of seed apertures 209 with a radius that is between the third and fourth radius CR, DR of FIG. 10 such that the upper seed output port 227U is operative to receive seeds from the seed apertures in the outer row 207AB and the lower seed output port 227L is operative to receive seeds from the seed apertures in the inner row 207CD.

Figure 13:
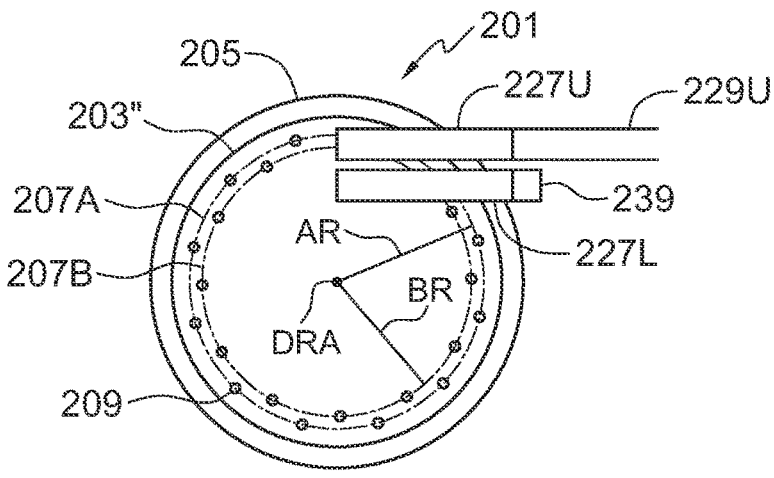
FIG. 13 is a schematic side view of a further alternate embodiment of the present disclosure.

FIG. 13 schematically illustrates the apparatus 201 further comprising a two-row seed disc 203" operative to be rotated inside the housing about a disc rotational axis DRA. The two-row seed disc 203" comprises an outer row 207A of seed apertures 209 with a radius substantially equal to the first radius AR of FIG. 10, and an inner row 207B of seed apertures with a radius that is substantially equal to the second radius BR of FIG. 10 such that the upper seed output port 227U is operative to receive seeds from the seed apertures in the outer and inner rows 207A, 207B and direct the seeds into the upper seed conduit 229U and the lower seed output port 227L is blocked by a plug 239 or the like. Alternatively the two row disc 201 could be configured to direct the seeds into the lower seed conduit 229L and the upper seed output port 227U could be blocked by the plug.

Figure 14:
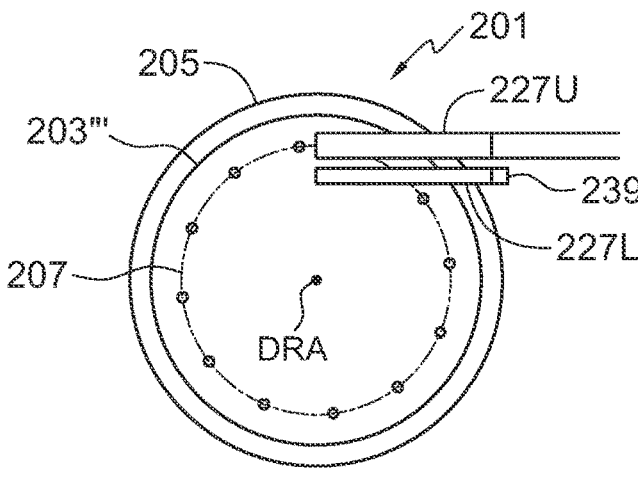
FIG. 14 is a schematic side view of a further alternate embodiment of the present disclosure with a single row of seed apertures.

FIG. 14 schematic illustrates the apparatus 201 comprising a one-row seed disc 203''' operative to be rotated inside the housing 205 about the disc rotational axis DRA and comprising a solitary row of seed apertures 207 defined by a seed side of the seed disc 203'''. When the one-row seed disc 203''' is installed in the singulating meter apparatus 201 and the lower seed output port is blocked by the plug 239.

FIG. 5 schematically illustrates a singulating meter apparatus 101 where the seed output port 127 is operative to dispense the seeds received from the seed apertures 109 in the outer aperture row 107A into the outer seed conduit 131A, and to dispense the seeds received from the seed apertures in the inner aperture row 107B into the inner seed conduit. A seed counting sensor 141 is mounted on the seed output port and is operative to count the seeds 143 passing through the seed output port in both of the inner and outer seed conduits 131A, 131B. The seed counting sensor 141 also records a time when each seed is counted to provide feedback on seed spacing.

In FIG. 5 the seed apertures 109 on the inner aperture row 107B are on a plurality of equally spaced inner radial lines BRL and the seed apertures on the outer aperture row 107A are on a plurality of equally spaced outer radial lines ARL. It is desired to have the seeds from each row 107A, 107B arranged so they alternate when passing through the seed counting sensor 141 to avoid confusing the seed counting sensor 141 when two seeds pass very close together. To achieve that end the seed apertures 109 on the outer radial lines ARL are positioned substantially midway between the seed apertures 109 on the inner radial lines BRL such that seeds 143 first pass through the seed counting sensor 141 alternately and then are dispensed alternately into the inner seed conduit 131B and into the outer seed conduit 131A.

FIGS. 10 and 11 show a four-row seed disc 203 operative to be rotated inside the housing about a disc rotational axis DRA. The apparatus 201 is operative to dispense the seeds received from the seed apertures 209 in the first and second aperture rows 207A, 207B into the upper seed output port 227U, and to dispense the seeds received from the seed apertures in the third and fourth aperture rows 207C, 207D into the lower seed output port 227L. In FIG. 10, the seeds received from the seed apertures in the first and second aperture rows 207A, 207B are dispensed into an upper seed conduit 229U, and the seeds received from the seed apertures in the third and fourth aperture rows 207C, 207D into a lower seed conduit 229L.

In FIG. 11, the upper and lower seed output ports 227U, 227L are further operative to direct the seeds received from the seed apertures in the first aperture row 207A into a first seed conduit 231A, in the second aperture row 207B into a second seed conduit 231B, in the third aperture row 207C into a third seed conduit 231C, and in the fourth aperture row 207C into a fourth seed conduit 231D.

In FIG. 11 the seed apertures 209 on the first aperture row 207A are on a plurality of equally spaced first radial lines 225A, the seed apertures on the second aperture row 207B are on a plurality of equally spaced second radial lines 225B, the seed apertures on the third aperture row 207C are on a plurality of equally spaced third radial lines 225C, and the seed apertures on the fourth aperture row 207D are on a plurality of equally spaced fourth radial lines 225D. The aperture angles AN between each of the first 225A, second 225B, third 225C, and fourth 225D radial lines are arranged so that the seed apertures on the each aperture row are positioned relative to the seed apertures on the other aperture rows such that seeds in the first, second, third, and fourth aperture rows alternate as the seeds pass through the output ports 227U, 227L. In the apparatus of FIG. 11 the aperture angle AN between each of the first 225A, second 225B, third 225C, and fourth 225D radial lines is the substantially same.

In such an arrangement the seeds carried in the seed apertures 209 in all the rows alternate as they are dispensed through the seed counting sensor 241 which counts all the seed dispensed into the seed conduits 231A, 231B, 231C, and 231D. The speed of the air stream flowing in each conduit 231 will vary somewhat depending on the length of each conduit 231. Where the first, second, third, and fourth seed conduits have a difference in length no greater than 24 inches satisfactory results can be achieved.

Figure 11A:
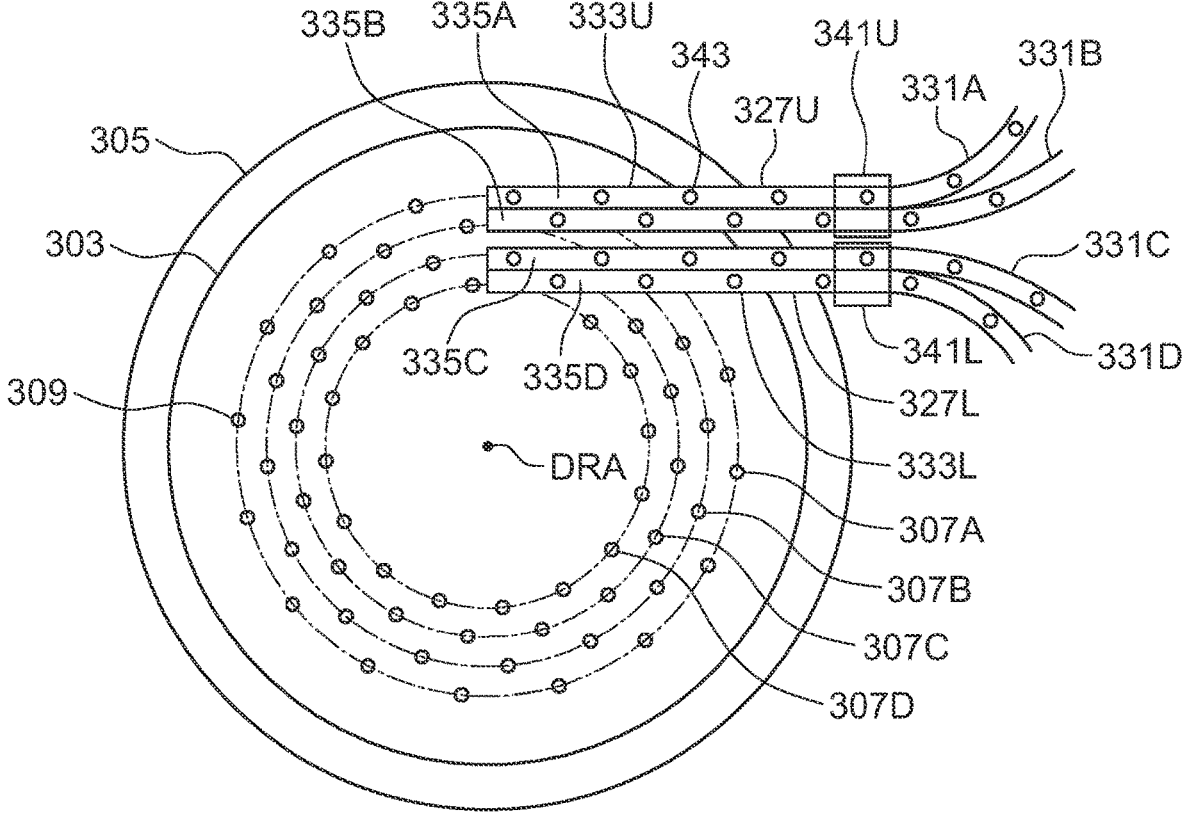
FIG. 11A is a schematic side view of an alternate configuration of the four row disc of FIG. 11.

In FIG. 11A upper and lower seed counting sensors 341U, 341L are provided, and the seed apertures 309 on the first aperture row 307A are located midway between the seed apertures 309 on the second aperture row 307B while the seed apertures 309 on the third aperture row 307C are located midway between the seed apertures 309 on the fourth aperture row 307D.

An upper converter 333U is inserted into the upper seed output port 327U, the upper converter 333U defining first and second seed channels 335A, 335B connected to the corresponding first and second seed conduits 331A, 331B, and a lower converter 333L is inserted into the lower seed output port 327L defining third and fourth seed channels 335C, 335D connected to the corresponding third and fourth seed conduits 331C, 331D.

In this arrangement the seeds flowing in the seed channels 335A, 335B alternate as they pass through the upper seed counting sensor 341U while the seeds flowing in the seed channels 335C, 335D alternate as they pass through the lower seed counting sensor 341L.

The present disclosure improves singulation spacing by reducing the number of apertures that contain two seeds. Also disclosed is an apparatus that allows a two-row seed disc to deposit the seeds in single seed conduit, or into two separate seed conduits. Also disclosed is a four row disc a four-row disc where, similarly, the outer two rows can be deposited into a single conduit or into individual conduits, and the inner two rows can also be deposited into a single conduit or into individual conduits. Also disclosed is a meter apparatus that can be converted between seeding through one output port or two output ports. The output ports can consist of either one seed channel (single mode) or two seed channels (dual mode). A seed counting sensor is provided that counts all the seeds dispensed by the singulating meter apparatus.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A singulating meter apparatus comprising:
a seed disc operative to be rotated in a housing about a disc rotational axis;
concentric first and second aperture rows of seed apertures defined by a seed side of the seed disc;
wherein the first aperture row is spaced along an outer first circular path with a first radius, the second aperture row is spaced along a second circular path with a second radius that is less than the first radius;
a first singulator arranged to protrude from an outer side of the first circular path partially into the seed apertures on the first aperture row as the seed disc rotates;
a second singulator arranged to protrude from an inner side of the second circular path partially into the seed apertures on the second aperture row as the seed disc rotates; and
a third singulator arranged to protrude from an inner side of the first circular path partially into the seed apertures on the first aperture row as the seed disc rotates and further arranged to protrude from an outer side of the second circular path partially into the seed apertures on the second aperture row as the seed disc rotates.

2. The apparatus of claim 1 further comprising:
a concentric third aperture row of seed apertures defined by the seed disc and Spaced along a third circular path with a third radius that is less than the second radius; and
a fourth singulator arranged to protrude from an inner side of the third circular path partially into the seed apertures on the third aperture row as the seed disc rotates;
wherein the second singulator is further arranged to protrude from an outer side of the third circular path partially into the seed apertures on the third aperture row as the seed disc rotates.

3. The apparatus of claim 2 further comprising:
a concentric fourth aperture row of seed apertures defined by the seed disc and spaced along a fourth circular path with a fourth radius that is less than the third radius; and
a fifth singulator arranged to protrude from an inner side of the fourth circular path partially into the seed apertures on the fourth aperture row as the seed disc rotates;
wherein the fourth singulator is further arranged to protrude from an outer side of the fourth circular path partially into the seed apertures on the fourth aperture row as the seed disc rotates.

4. The apparatus of claim 1 wherein the singulators are mounted on a singulating assembly.

5. The apparatus of claim 4 wherein the singulating assembly is biased toward the seed side of the seed disc.

6. The apparatus of claim 1 wherein the seed apertures on the first aperture row are on a plurality of equally spaced first radial lines and the seed apertures on the second aperture row are on a plurality of equally spaced second radial lines and the second radial lines are substantially midway between the first radial lines.

7. The apparatus of claim 1 wherein at least one of the singulators comprises at least two separate singulator portions.

8. A singulating meter apparatus comprising:
a housing and a two-row seed disc operative to be rotated inside the housing about a disc rotational axis;
concentric inner and outer aperture rows of seed apertures defined by a seed side of the two-row seed disc wherein the outer aperture row is spaced along an outer circular path with an outer radius, and the inner aperture row is spaced along an inner circular path with an inner radius that is less than the outer radius; and
a seed output port operative to receive seeds from the seed apertures in the inner and outer aperture rows;
wherein the seed output port is operative, when in a single mode, to dispense the seeds received from the inner and outer aperture rows into a single seed conduit defining a single flow path for seeds received from both the inner and outer aperture rows, and wherein the seed output port is operative, when in a dual mode, to dispense the seeds received from the seed apertures in the outer aperture row into an outer seed conduit, and is further operative when in the dual mode to dispense the seeds received from the seed apertures in the inner aperture row into an inner seed conduit.

9. The apparatus of claim 8 comprising a convertor operative to be inserted into the seed output port, the convertor defining inner and outer seed channels, and wherein when the seed output port is in the single mode, the convertor is removed and the single seed conduit is connected to the seed output port, and when the seed output port is in the dual mode the convertor is inserted into the seed output port and the inner and outer seed conduits are connected to the convertor.

10. The apparatus of claim 8 wherein one of the inner and outer seed conduits is provided by the single seed conduit.

11. The apparatus of claim 8 wherein the single seed conduit is provided by one of the inner and outer seed conduits.

12. A singulating meter apparatus comprising:
a two-row seed disc operative to be rotated about a disc rotational axis;
concentric inner and outer aperture rows of seed apertures defined by a seed side of the two-row seed disc wherein the outer aperture row is spaced along an outer circular path with an outer radius, the inner aperture row is spaced along an inner circular path with an inner radius that is less than the outer radius;
a seed output port operative to dispense the seeds received from the seed apertures in the outer aperture row into an outer seed conduit, and to dispense the seeds received from the seed apertures in the inner aperture row into an inner seed conduit; and a seed counting sensor operative to count the seeds passing through the seed output port to the inner and outer seed conduits.

13. The apparatus of claim 12 wherein the seed counting sensor records a time when each seed is counted.

14. The apparatus of claim 12 wherein the seed apertures on the inner aperture row are positioned relative to the seed apertures on the outer aperture row such that seeds in the inner and outer aperture rows alternate as the seeds pass through the seed counting sensor.

15. The apparatus of claim 14 wherein the seed apertures on the inner aperture row are on a plurality equally spaced of inner radial lines and the seed apertures on the outer aperture row are on a plurality of equally spaced of outer radial lines and the outer radial lines are substantially midway between the inner radial lines such that seeds are dispensed alternately into the inner seed conduit and into the outer seed conduit.

16. The apparatus of claim 12 wherein the outer seed conduit and the inner seed conduit have a difference in length no greater than 24 inches.

* * * * *